United States Patent [19]

Futamura et al.

[11] Patent Number: 5,558,033

[45] Date of Patent: Sep. 24, 1996

[54] IMAGE FIGURE PROCESSING METHOD AND DEVICE

[75] Inventors: Masao Futamura; Yukiyoshi Muto; Masahiro Mizuno, all of Nagoya, Japan

[73] Assignee: Brother Kogyo Kabushiki Kaisha, Nagoya, Japan

[21] Appl. No.: 468,126

[22] Filed: Jun. 21, 1995

[30] Foreign Application Priority Data

Jul. 29, 1994 [JP] Japan .................................. 6-197926

[51] Int. Cl.⁶ .................................................. D05C 5/02
[52] U.S. Cl. .................................. 112/475.19; 112/102.5; 364/470.09; 364/470.07
[58] Field of Search .......................... 112/102.5, 470.04, 112/470.06, 475.05, 475.19, 475.18; 364/470; 358/474, 515, 518

[56] References Cited

U.S. PATENT DOCUMENTS

| 4,991,524 | 2/1991 | Ozaki ................................ 112/102.5 |
| 5,386,789 | 2/1995 | Futamura et al. .................... 112/102.5 |
| 5,390,126 | 2/1995 | Kongho et al. ................ 112/470.04 X |

FOREIGN PATENT DOCUMENTS

61-252758  11/1986  Japan .

*Primary Examiner*—Peter Nerbun
*Attorney, Agent, or Firm*—Oliff & Berridge

[57] ABSTRACT

In image figure processing method and apparatus, an original picture, in which inner spaces of readable outlines are painted with desired colors, is read out by an image scanner to extract boundary lines defining closed areas in the original picture. Subsequently, the average value of brightness values in each closed area is calculated for each of R, G and B components, and the average value is compared with a data table value stored in a memory to identify the attribute of each closed area. Thereafter, embroidery data are prepared to embroider the respective closed areas in the original picture so that the colors and shapes thereof match those of the original picture.

23 Claims, 9 Drawing Sheets

| COLOR (BRIGHTNESS - VALUE SPACE) | BRIGHTNESS VALUE ON RGB |
|---|---|
| BLACK (S1) | ($0 \leq r \leq 7$, $0 \leq g \leq 7$, $0 \leq b \leq 7$) |
| RED (S2) | ($8 \leq r \leq 15$, $0 \leq g \leq 7$, $0 \leq b \leq 7$) |
| GREEN (S3) | ($0 \leq r \leq 7$, $8 \leq g \leq 15$, $0 \leq b \leq 7$) |
| BLUE (S4) | ($0 \leq r \leq 7$, $0 \leq g \leq 7$, $8 \leq b \leq 15$) |
| YELLOW (S5) | ($8 \leq r \leq 15$, $8 \leq g \leq 15$, $0 \leq b \leq 7$) |
| LIGHT BLUE (S6) | ($0 \leq r \leq 7$, $8 \leq g \leq 15$, $8 \leq b \leq 15$) |
| PINK (S7) | ($8 \leq r \leq 15$, $0 \leq g \leq 7$, $8 \leq b \leq 15$) |
| WHITE (S8) | ($8 \leq r \leq 15$, $8 \leq g \leq 15$, $8 \leq b \leq 15$) |

IMAGE FIGURE PROCESSING METHOD AND DEVICE

BACKGROUND OF THE INVENTION

1. Field of the Invention

The invention relates to an image figure processing method and device, and particularly to an image figure processing method and device in which a figure of closed-area shape and its attribute can be easily obtained by reading out an original image of a pattern only once.

2. Description of Related Art

An embroidery-data preparing device having an image processing function as described below has been practically used to prepare embroidery data with which an embroidered pattern is sewn using an embroidery-sewing machine. In the embroidery-data preparing device, an original picture having the outline of a pattern to be embroidered is prepared in advance. It is then read out with an image scanner device to be displayed as pattern image data on a display unit. The outline of the pattern thus displayed is indicated at plural positions thereon with a coordinate input device, such as a mouse, to specify each figure of closed-area shape which is contained in the original picture, whereby figure image data comprising an assembly of coordinate points at the indicated plural positions on the outline of the pattern can be obtained for every figure. The embroidery data for the embroidery sewing are prepared on the basis of the figure image data of each figure, and also thread-color information is provided as an attribute for each figure through thread-color indicating processing. As discussed herein, a "figure of closed-area shape" is defined as a figure whose inner space is completely surrounded by at least one line, that is, the figure is completely surrounded by its outline. In the following description, such a figure of closed-area shape is referred to as a "closed figure".

Recently, it has been required to sew complicated and colorful embroidered patterns and an automatic image figure processing device has been used to meet this requirement. In this device, an original picture containing a colorful pattern is read out with a color image scanner device. Then the pattern image data of the original picture pattern, which are output from the image scanner device, are color-separated into three primary color data (red(R), green(G) and blue(B)) to prepare three figure image data of primary colors (R, G and B) each of which has a brightness value for the color. On the basis of the figure image data, each figure having the same color is specified, and the color of the figure is also identified. Furthermore, in the automatic image figure processing device, the embroidery data for embroidery sewing are prepared on the basis of the figure image data for each figure.

As described above, in the above embroidery data preparing device, having the image processing function in which the figure image data are prepared with the mouse on the basis of the pattern image data which are read out by the image scanner device and displayed on the display unit, the outline of the pattern on the display unit must be indicated over plural positions on the outline. Therefore, if a pattern to be embroidered has a large size and contains a large number of figures, the work of indicating the outline of the pattern with a mouse is complicated and cumbersome. In addition, it takes a long time to perform such work, so that figure image data preparation efficiency is reduced.

Furthermore, in the automatic image figure processing device in which a colorful original picture pattern is read out with an image scanner device and the pattern image data of the read-out original picture pattern are color-separated to prepare figure image data containing brightness-value data of primary colors, at a boundary portion between neighboring figures having different colors, the pattern image data may be color-separated into figure image data having an intermediate color between the different colors. Therefore, there occurs a problem that the outline of a specified figure is deformed zigzag or the original figure is deformed due to occurrence of the intermediate color. In addition, if any shade of color or unevenness in color density occurs in the color of a colored figure, some portions having a different color density or brightness are missed, or an excessively long image processing time is required.

SUMMARY OF THE INVENTION

An object of the invention is to provide an image figure processing method and an image figure processing device in which any closed figure contained in an original picture pattern and its attribute can be simply obtained for every figure, faithful to the original, by specifying the figure on the basis of the outline thereof.

In order to attain the above object, according to the invention, an image figure processing device for reading out an original picture pattern which is drawn with a specific outline so as to be discriminable on image processing and in which closed areas surrounded by the specific outline are colored (painted with colors) or marked so as to be discriminable on the image processing, thereby to obtain pattern image data of the original picture pattern, and extracting image data representing each figure on the basis of pattern image data of the original picture pattern, is characterized by comprising image input means for reading out the original picture pattern and converting the pattern to the pattern image data, closed-area specifying means for receiving the pattern image data from the image input means to specify at least one closed figure which is surrounded by the specific outline in the original picture pattern, statistic calculation means for calculating a statistic of the pattern image data of each figure specified by the closed area specifying means on the basis of the pattern image data which are obtained by the image input means, and closed area attribute identification means for identifying the attribute of each figure in the pattern image on the basis of the statistic calculated by the statistic calculation means.

According to the image figure processing device of the invention, the image input means reads out the original picture pattern containing the specific outline which is discriminable on the image processing, and converts the read-out pattern to the pattern image data, and then the closed-area specifying means receives the pattern image data obtained by the image input means to specify the one or more closed figures which are surrounded by the specific outline in the pattern image. Thereafter, on the basis of the pattern image data obtained by the image input means, the statistic calculation means calculates the statistic of the pattern image data of each figure which is specified by the closed-area specifying means, and the closed-area attribute identification means identifies the attribute of each figure in the pattern image on the basis of the statistic obtained by the statistic calculation means.

As described above, the pattern image data of the original picture pattern containing the specific outline which is discriminable on the image processing can be obtained, and the closed figures which are surrounded by the specific outline can be specified on the basis of the pattern image data. In addition, the attribute of each figure in the pattern image is identified on the basis of the statistic of the pattern image data. Therefore, each figure contained in the original picture pattern can be prevented from being deformed or missed, and the closed figures and their attribute can be accurately and simply obtained that are faithful to the original picture pattern.

The statistic calculation means may be designed to calculate the statistic of pattern image data on brightness of each of the three primary color components (R, G, B) of each figure. With this structure, even when the color of a figure is color-separated into an intermediate color due to a different color of its neighboring figure at a boundary portion between the neighboring figures in the pattern original pattern, the color variation is ignored and, thus, the color of each figure in the pattern image can be identified with high precision.

Furthermore, an average value of brightness of each of the three primary colors (R, G, B) may be used as the statistic which is used for the calculation by the statistic calculation means. In this case, even if any shade of color or unevenness in color density occurs in the color of each figure, the differences are ignored, and the attribute of each figure in the pattern image can be identified with high precision.

BRIEF DESCRIPTION OF THE DRAWINGS

A preferred embodiment according to the invention will be described in detail with reference to the following figures wherein.

DETAILED DESCRIPTION OF THE PREFERRED EMBODIMENT

A preferred embodiment according to the invention will be described hereunder with reference to the accompanying drawings.

The embodiment is an image figure processing device for preparing embroidery data. The embroidery data are prepared as follows. A color original picture pattern 20 (see FIG. 6) is prepared by a line drawing for coloring or the like, and the original picture pattern 20 is read out to obtain pattern image data. The pattern image data thus obtained are subjected to image data processing to prepare embroidery data (stitch data for each stitch of a needle) to embroider the pattern on an article, such as, for example, a processed cloth.

Figure 1:
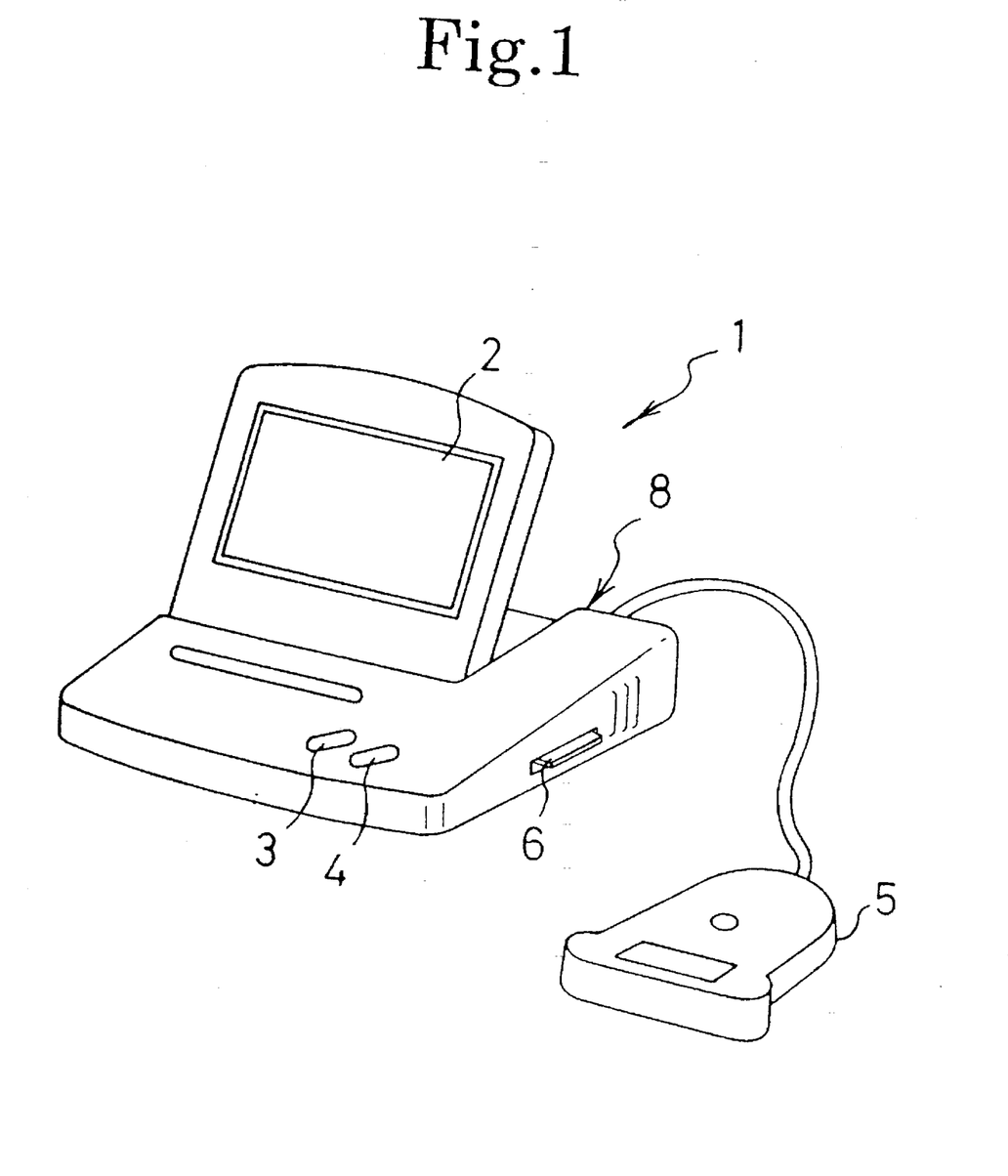
FIG. 1 is a perspective view showing an image figure processing device.

As shown in FIG. 1, the image figure processing device 1 comprises a liquid crystal display 2 for displaying characters or images, operation keys 3 and 4 for executing a read-out operation of the original picture pattern 20 and the image processing therefor, a portable color scanner device 5 for reading out the color original picture pattern 20, a flash memory device (FMD) 7 (FIG. 2) in which a memory card 6 comprising a non-volatile flash memory is detachably mounted, and a control body portion 8 connected to the above elements. An input port 15 and an output port 16 (FIG. 2) are provided in the rear of the control body portion 8.

The input port 15 can be connected to a personal computer 18. When the pattern image data are prepared in the personal computer, the image figure processing device 1 can read out the pattern image data from the personal computer through the input port 15.

The output port 16 is connected to an embroidery-sewing machine. Embroidery data which are prepared in the image figure processing device I are transmitted through the output port 16 to the embroidery-sewing machine. The embroidery-sewing machine forms an embroidered pattern on the basis of the embroidery data thus prepared.

The color scanner device 5 reads in respective brightness-value signals of three primary colors (R, G and B) per pixel while moved in a predetermined direction (auxiliary scanning direction) along the upper surface of a color original picture pattern, converts the read-in brightness-value signals to pattern image data, which are bit map data comprising the brightness-value signals of the three primary colors for every raster, and outputs the pattern image data.

Figure 6:
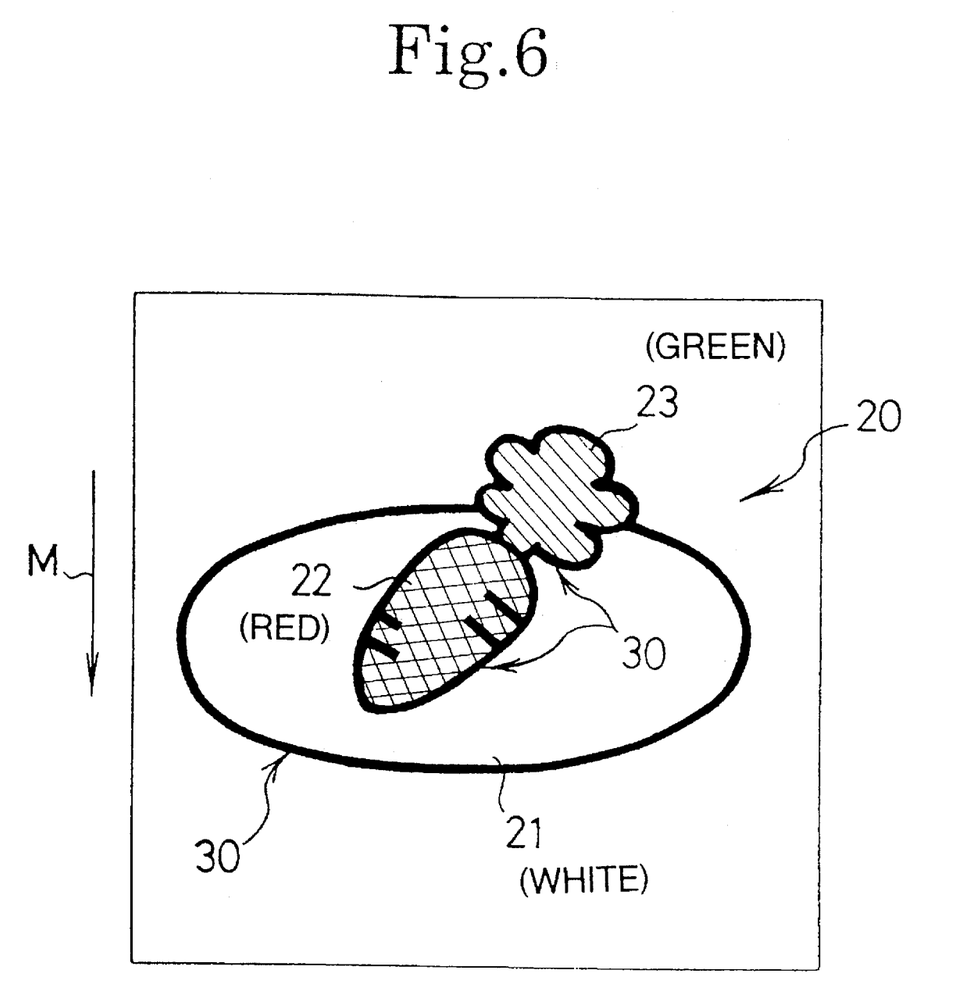
FIG. 6 is an original picture pattern which is prepared by a line drawing for coloring.

In this embodiment, a pattern containing "a dish and a carrot", shown in FIG. 6, is used as the color original picture pattern 20 to be read out by the color scanner device 5. The "dish" 21 is "white" and the "carrot" is on the dish 21. The "root" 22 of the carrot is "red" and the "leaf" 23 is "green". Further, each of the "dish" 21, the "root" 22 and the "leaf" 23 is surrounded by a specific outline of "black" solid-line. These figures are drawn with the specific outline 30 so that the shape of each figure is discriminable.

Figure 2:
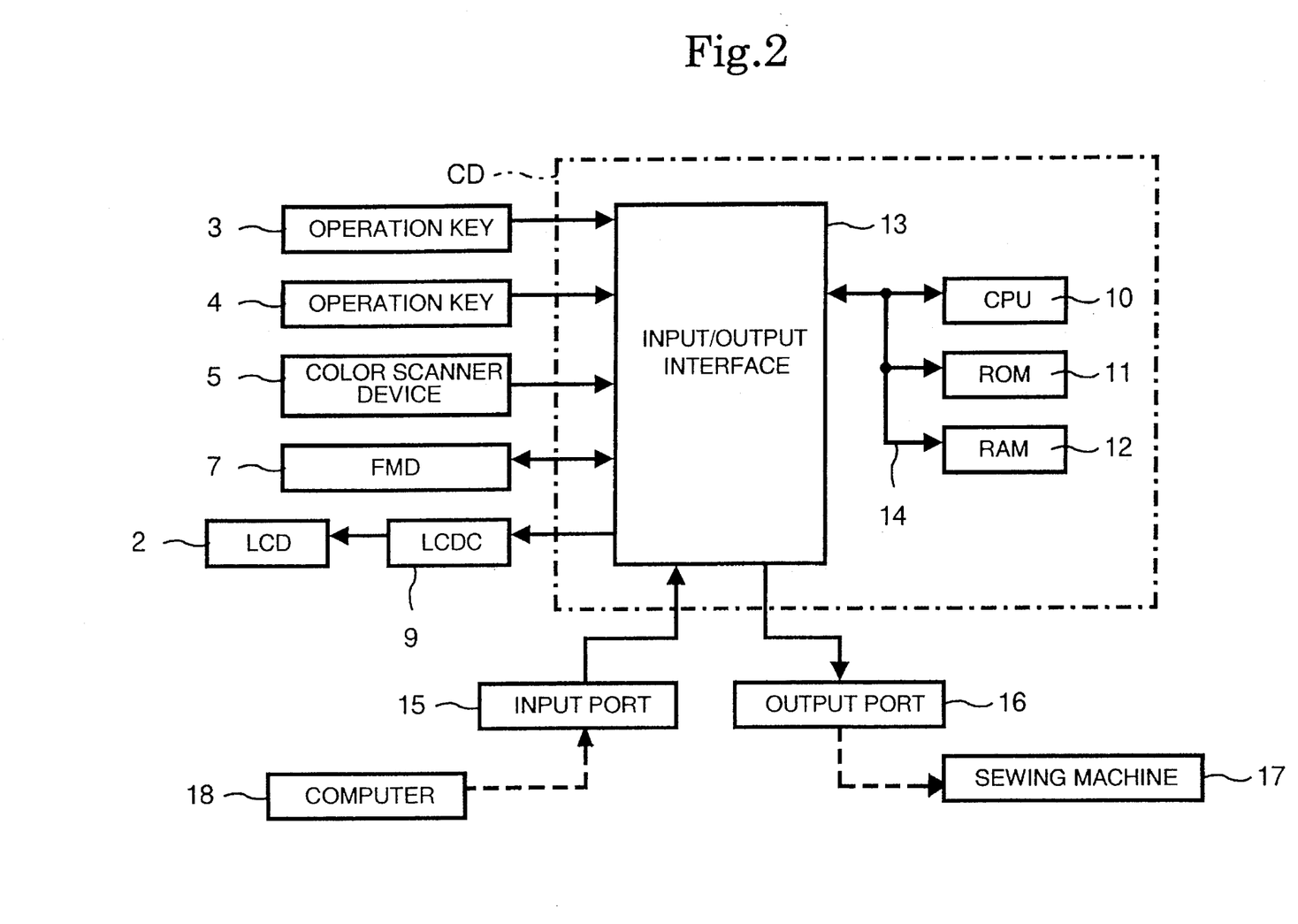
FIG. 2 is a block diagram showing a control system for the image figure processing device.

The control system of the image figure processing device 1 is structured as shown in FIG. 2. A control device CD is built into the" control body portion 8. The input/output interface 13 of the control device CD is connected to the two operation keys 3,4, the color scanner device 5, the flash memory device 7 and a display controller (LCDC) 9, that has a video RAM for outputting display data to a liquid crystal display (LCD) 2.

The control device CD includes a CPU 10, the input/output interface 13 which is connected to the CPU 10 through a bus line 14 having a data bus and an address bus, a ROM 11 and a RAM 12.

Figure 5:
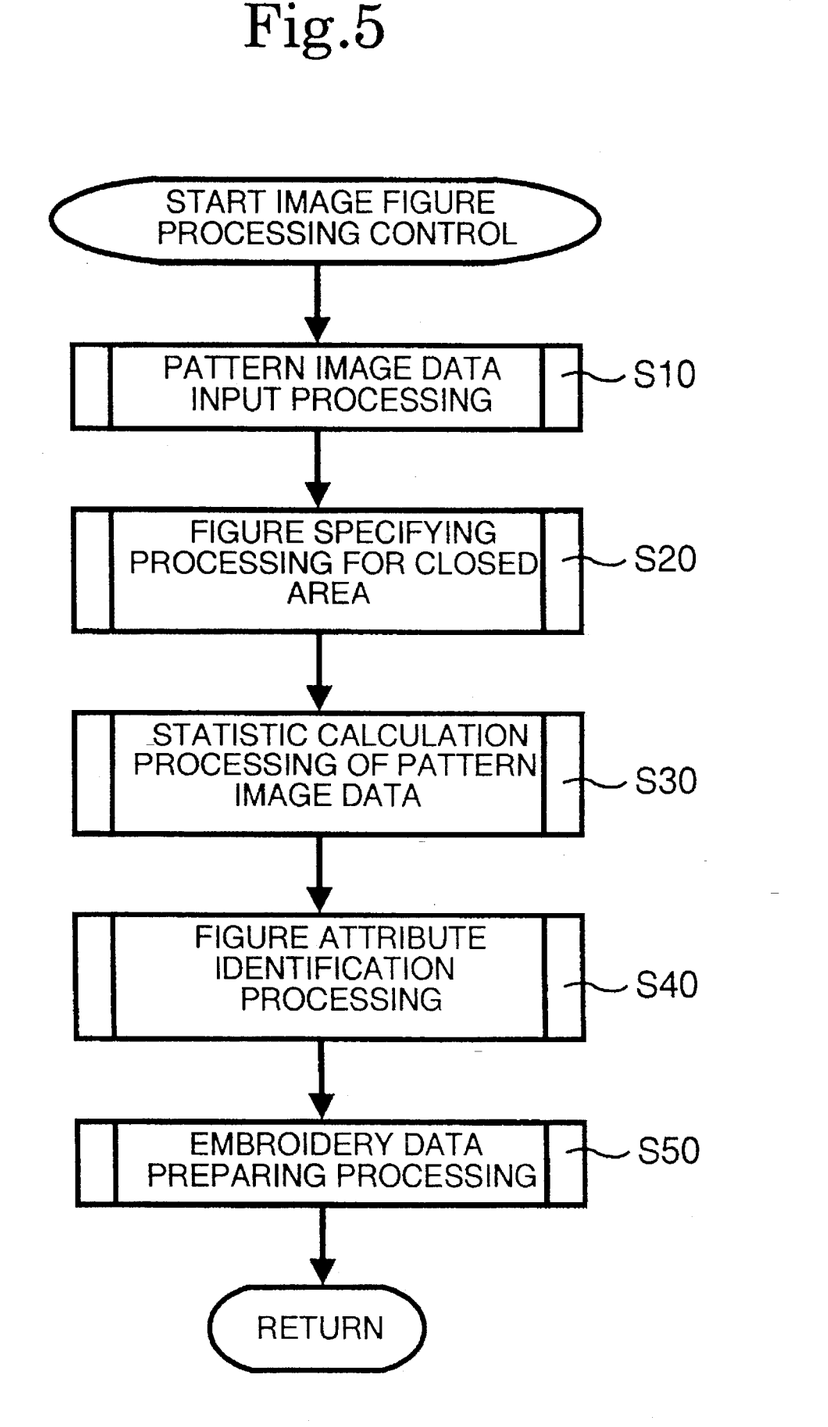
FIG. 5 is a flowchart showing the routine of the image figure processing control.

The ROM 11 stores a display driving control program to control the display controller 9 on the basis of the read-out pattern image data, a control program for image figure processing control as shown in FIG. 5, and other control programs. The image figure processing control program is provided a specific outline calculation control program (specific outline algorithm) to obtain the specific outline 30 through calculation on the basis of the brightness-value data of the specific outline.

Figure 3:
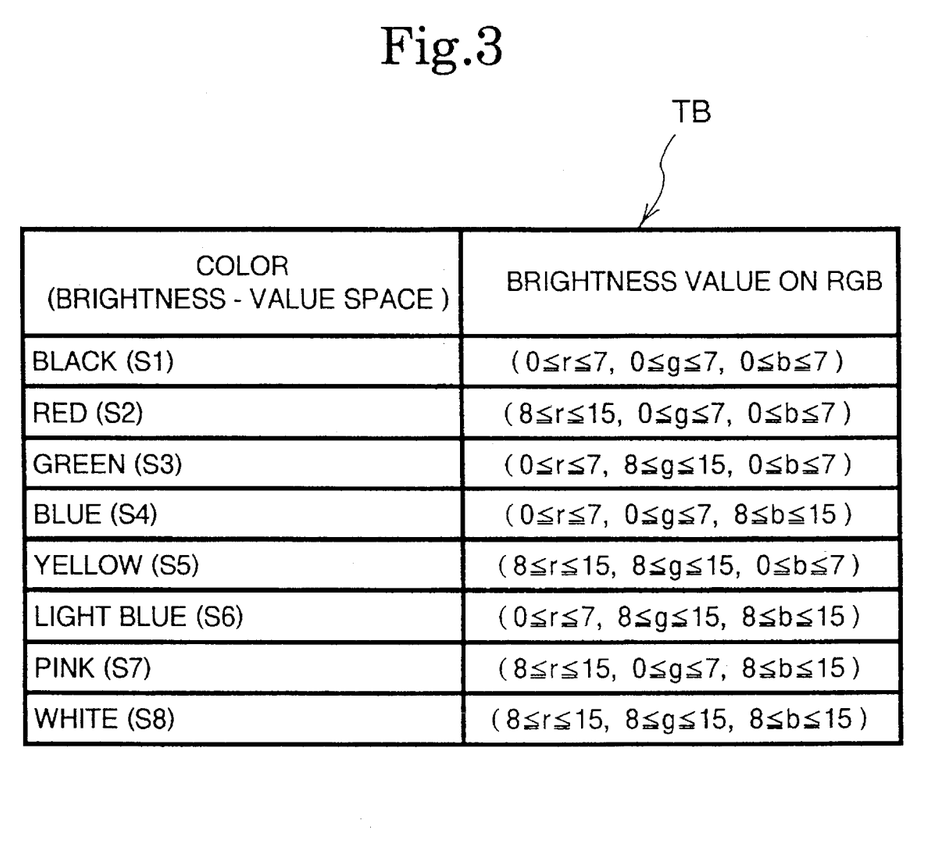
FIG. 3 shows the setting content of a brightness-value table.

The ROM 11 also contains a brightness-value table TB in which the ranges of the brightness values r, g and b of the three primary colors R, G and B are respectively allocated to eight kinds of colors "black", "red", "green", "blue", ... "white".

Figure 4:
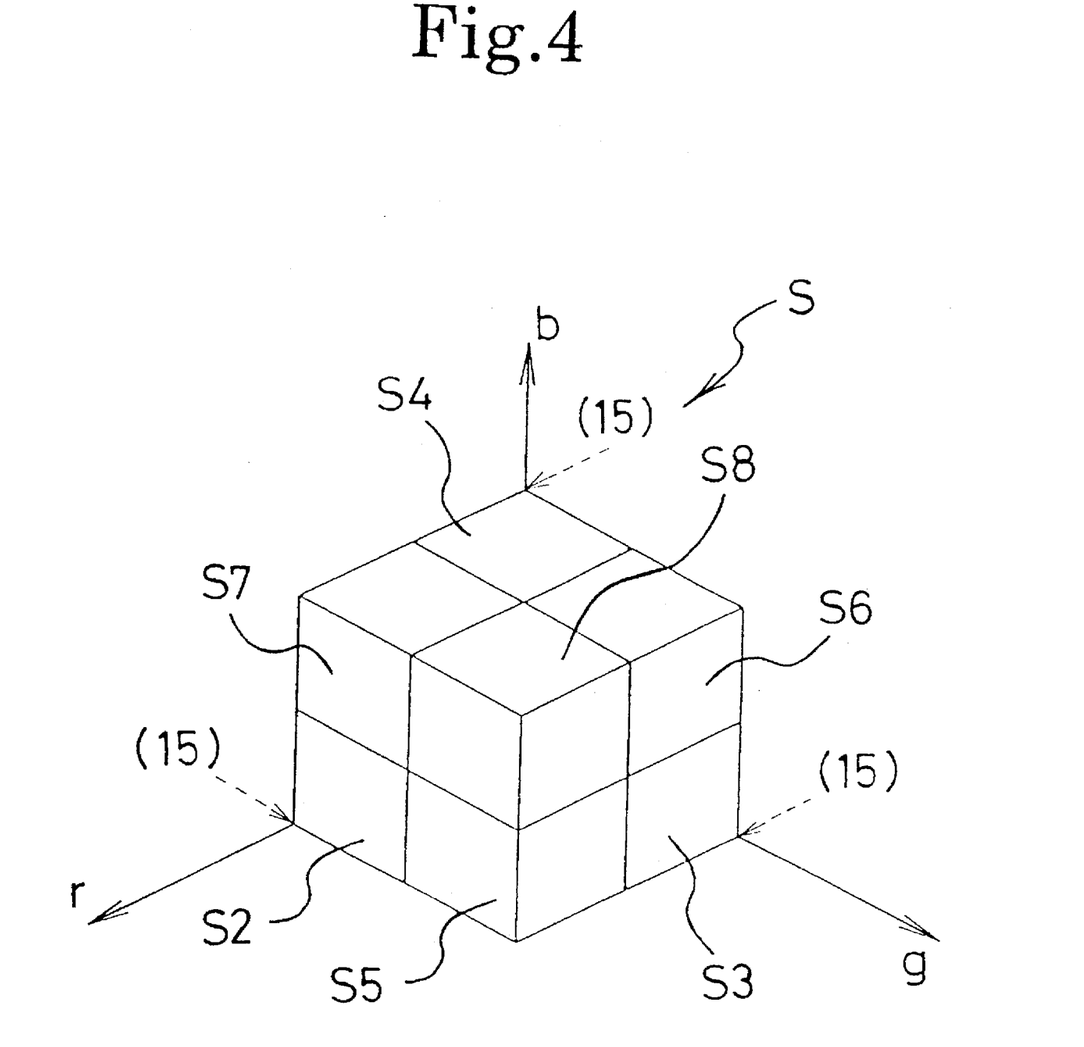
FIG. 4 is a schematic view showing the three-dimensional space of a brightness-value area.

Here, the three-dimensional space S for a brightness value area which is the solid space of the respective brightness values of the three primary colors (R, G, B) is structured as shown in FIG. 4. In accordance with the brightness values r, g and b of R, G and B, a brightness value area space S1 (not shown) is set to "black", a brightness-value area space S2 is set to "red", a brightness-value area space S3 is set to "green", a brightness-value area space S4 is set to "blue"..., and a brightness-value area space S8 is set to "white". In this embodiment, the maximum brightness value of each brightness value r, g, b is limited to "15". Each brightness value r, g, b is represented with four bits as described later.

The RAM 12 is provided with various kinds of memories, such as a memory 12a (see FIG. 7) for storing pattern image data which is obtained by reading out the pattern image with the color scanner device 5 and converting it to the pattern image data and a work memory for temporarily storing the calculation results obtained in the CPU 10.

The routine of the image figure processing control which is executed in the control device CD of the image figure processing device I will be described with reference to the flowchart of FIG. 5. In FIG. 5, reference characters Si (i=10, 20, 30, ...) represent each step. The image figure processing control contains an image figure processing method.

As described above, the color original picture pattern 20 is created by a line drawing for coloring, or similar process by an illustrator, before the image figure processing control is carried out. During creation of the drawing, or basic pattern, the "dish" 21, the "root" 22 of the carrot and the "leaf" 23 of the carrot are drawn with a solid outline 30 of "black". Further, the closed areas, which are surrounded by the outline 30, are colored with desired colors. In this case, the closed area corresponding to the "root" 22 is colored red, and the closed area corresponding to the "leaf" 23 is colored "green" by the illustrator.

Upon manipulation of the operation key 3, the image figure processing control is started. First, in step S10, the color scanner device 5 is shifted from a read-out start position of the original picture pattern 20 in a shift direction M, shown in FIG. 6, to read out the original picture pattern 20. Then, the pattern image data input processing is conducted to convert the read-out original picture pattern 20 to pattern image data and store the pattern image data into the figure image data memory 12. At this time, data (dn-1 to dn-N) obtained from a predetermined number pixels, for example, N=256, constituting a row in the color scanner device 5, are stored in a main scanning direction for every raster, or line.

Figure 7:
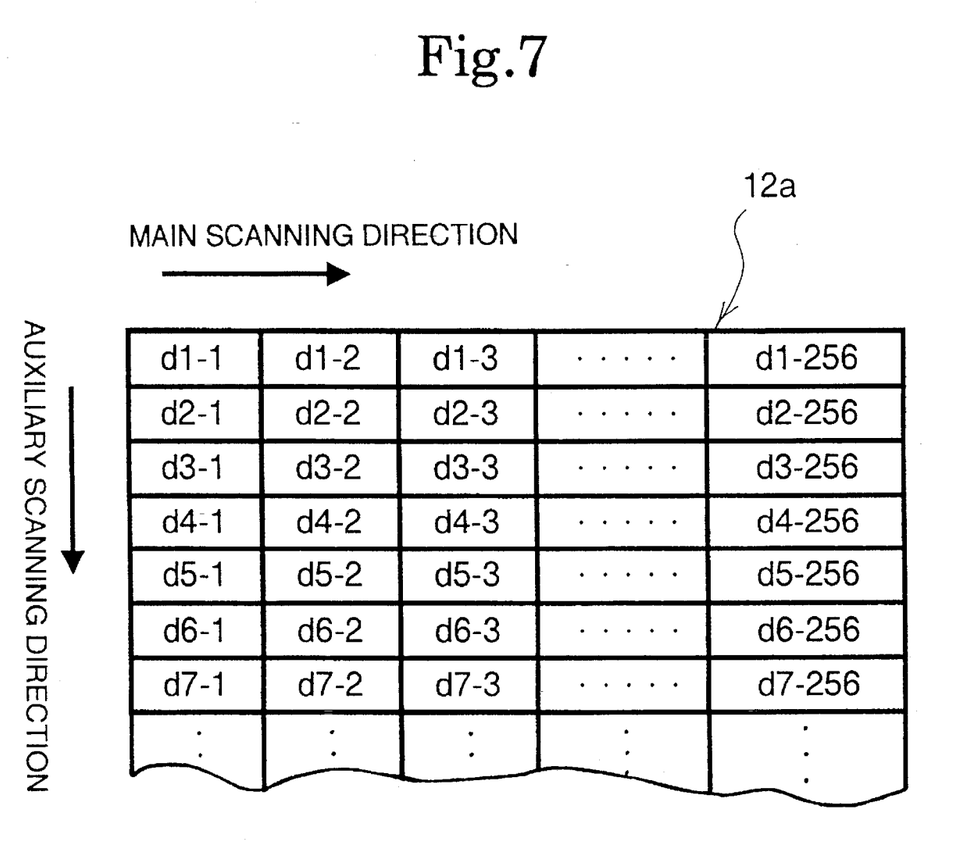
FIG. 7 is a table showing raster data in a pattern image data memory.

That is, as shown in FIG. 7, the raster data of a first line (d1-1 to d1-256) are successively stored from the head of the pattern image data memory 12a. Thereafter, the input pattern image data are successively stored in correspondence to the original picture pattern 20 from the raster data of a second line (d2-1 to d2-256) in the auxiliary direction, corresponding to the direction M, that is, raster data (d3-1 to d3-256), raster data (d4-1 to d4-256), ..., to raster data (dn-1 to dn-256). Each raster data d is represented with 12 bits. The raster data d of 12 bits contains brightness-value data r of 4 bits for red (R), brightness-value data g of 4 bits for green (G) and brightness-value data b of 4 bits for blue (B).

Alternatively, pattern image data which are prepared in an external personal computer may be read in through the input port 15 and stored in pattern image data memory 12a.

Subsequently, in step S20, the closed figures (closed-area type figures) which are surrounded by the outline 30 contained in the original picture pattern 20 are specified on the basis of the pattern image data stored in the pattern image data memory 12a to perform figure specifying processing.

Because the outline 30 is drawn with black, and the outline 30 separates specific parts of the pattern, figure-outline extraction processing is conducted on a link component figure which comprises pixels having the data value corresponding to the black color in the pattern image (a figure formed of an assembly of pixels which are adjacent to one another and linked to one another). The figure-outline extraction processing is performed by applying a well-known boundary line tracing algorithm as an image figure processing method, for example. The judgment on linkage may be made on the basis of any one of a four-linkage judgment or an eight-linkage judgment. Because the algorithm used may be chosen from known algorithms, a detailed description thereof is omitted.

When the boundary line tracing algorithm is directly applied to the color bit map image data, the judgment on linked black pixels may be made on the basis of a judgment as to whether the RGB brightness value of a pixel satisfies the following inequality: $R<2$, $G<2$ and $B<2$ which defines black.

As an alternative manner, the color image may be temporarily color-separated with suitable RGB brightness threshold values to convert it to monochromatic pattern bit map image (white and black image) comprising only an outline figure, and then a boundary line tracing algorithm for an ordinary binary image may be used.

Figure 8:
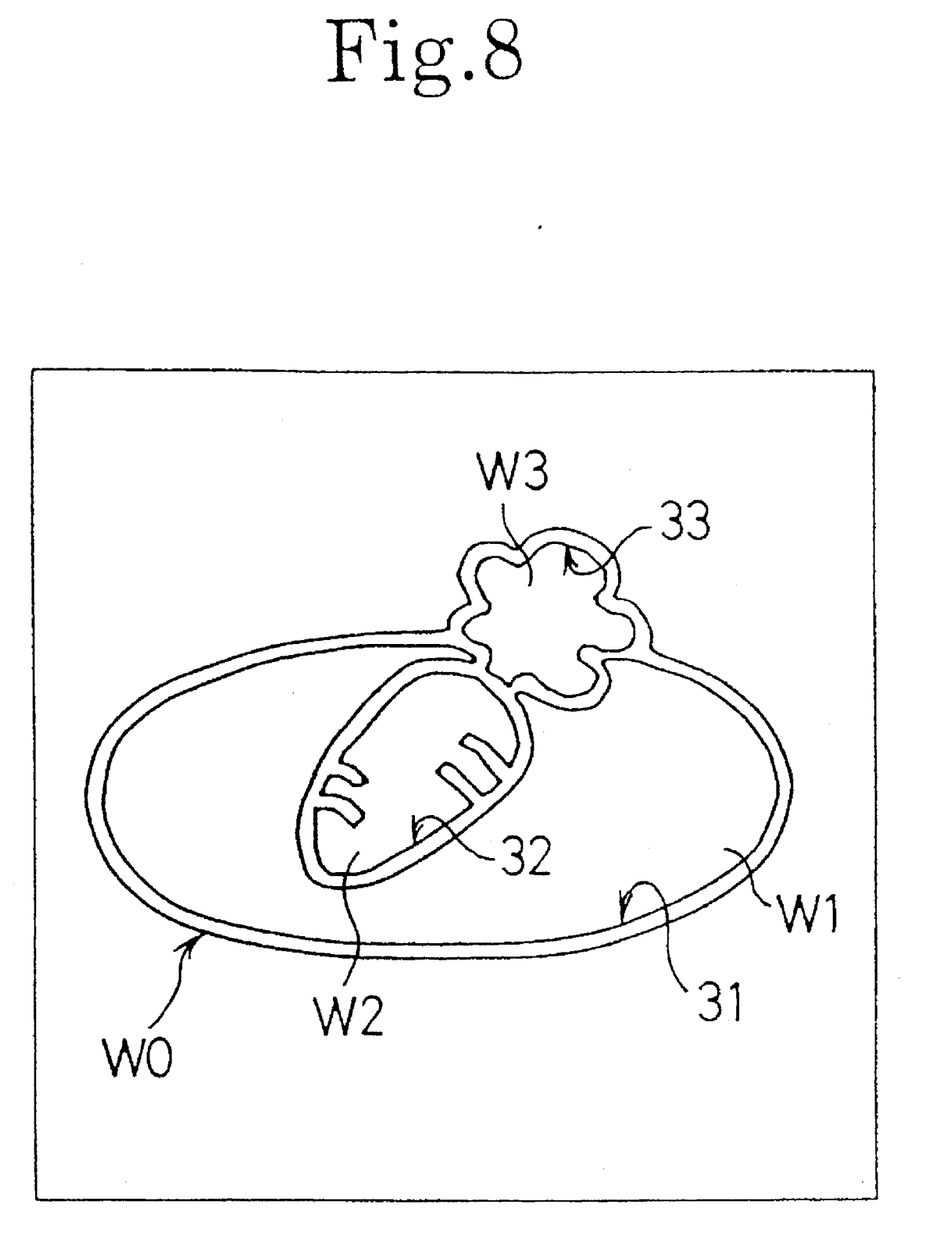
FIG. 8 is a diagram showing the outlines of figures contained in the original picture pattern.

As a result of the figure specifying processing, as shown in FIG. 8, the closed area W1 of a figure "dish" 21 is specified by an outline 31, the closed area W2 of a figure "root" 22 is specified by an outline 32, and the closed area W3 of a figure "leaf" 23 is specified by an outline 33. An outline W0 at the outside is neglected. The closed areas are specified by the elements or sub-outlines 31, 32, 33 of the outline 30 as described above. Thus, specification of the closed areas can be performed without deforming each closed area or without any closed area being missing.

Subsequently, in step S30, a statistic on the pattern image data for each of the closed areas W1 to W3 is calculated. In this case, an average value is calculated as the statistic. That is, the average value of each of the brightness-value data $r_i$ for red, the brightness-value data $g_i$ for green and the brightness-value data $b_i$ for blue contained in each raster data $d_i$ is calculated on the basis of the pattern image data contained in the inner areas of the closed areas W1 to W3. The brightness average value Rh for red is calculated according to a calculation equation: $Rh=(\Sigma r_i)/N$, the brightness average value Gh for green is calculated according to a calculation equation: $Gh=(\Sigma g_i)/N$, and the brightness average value Bh for blue is calculated according to a calculation equation: $Bh=(\Sigma b_i)/N$. As described above, the brightness average value is calculated for the brightness-value data of each of the three primary colors for each of the closed area W1 to W3, so that the shade of color and unevenness in color density in each closed area can be neglected because each closed area is set to a single color.

Subsequently, at step S40, an identification of the attribute of each figure, that is, of the "color" of each figure is defined using the statistic data on the pattern image data obtained at the step S30, that is, on the basis of the brightness average values Rh, Gh and Bh of the three primary colors. The brightness-value area space S1–S8 to which each closed area belongs is identified from the brightness-value area spaces S1 to S8 on the basis of the brightness average values Rh, Gh and Bh of red, green and blue which were calculated for each closed area on the basis of the data in the brightness-value table TB (FIG. 3). Thereafter, the color corresponding to the identified brightness-value area space (any one of S1 to S8) is designated as the color of the closed area.

For example, with respect to the closed area W1 for the figure "dish" 21, assume each of the brightness average values Rh, Gh and Bh for red, green and blue is in the range from "8" to "15" in brightness value. Thus the space of the brightness area for the closed area of the "dish" 21 is set to S8. Therefore, the color of the closed area W1 is identified as "white". With respect to the closed area W2 of the figure "root" 22, assume the brightness average value Rh for red is above "8", however, each of the brightness average values Gh and Bh for green and blue is below "7", so that the space of the brightness area for the closed area is set to S2. Therefore, the color of the closed area W2 is identified as "red". Furthermore, with respect to the closed area W3 of the figure "leaf" 23, assume the brightness average value Gh for green is above "8", however, each of the brightness average values Rh and Bh for red and blue is below "7", so that the space of the brightness area for the closed area is set to S3. Therefore, the color of the closed area W3 is identified as "green".

Subsequently, at step S50, a needle location point for each stitch is calculated on the basis of the outline for specifying the closed area of each figure which is obtained at the step S20, whereby embroidery data embroider each closed figure can be prepared. Furthermore, the embroidery data for each closed figure is provided with thread color information which is obtained for each closed figure at the step S40. The embroidery data for the plural closed figures are stored into the memory card 6 installed into the flash memory device 7. Thereafter, the control is completed and the process returns to the main routine.

The memory card 6 can then be installed into an embroidery-sewing machine 17. The embroidery data are successively read out from the memory card 6 and the pattern, which replicates the original picture pattern 20, is embroidered on the .article, such as the processed cloth. On the basis of the thread color information, the name of the color corresponding to the required thread color information is displayed on the embroidery-sewing machine. Alternatively, the embroidery data which are prepared by the image figure processing device 1 may be transmitted to the embroidery-sewing machine through the output port 16.

Figure 9:
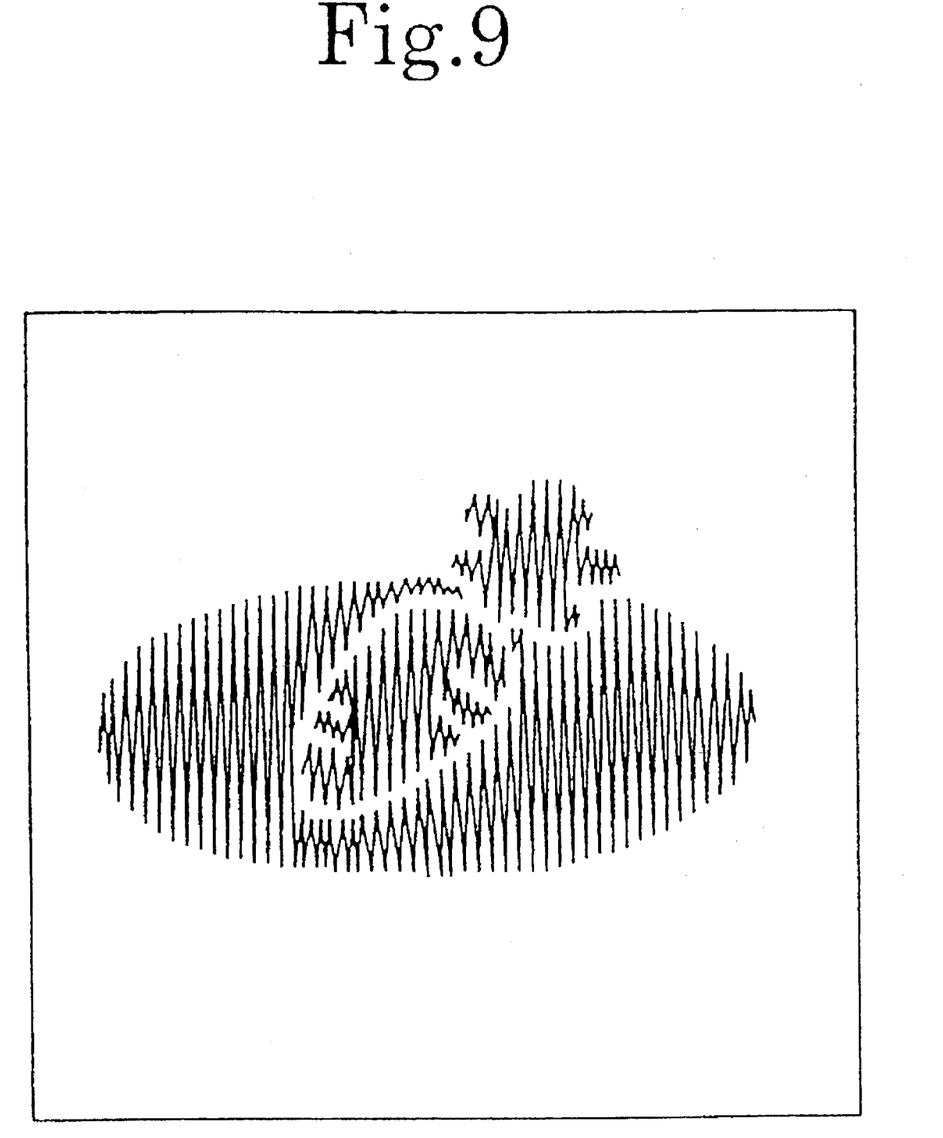
FIG. 9 is a diagram showing the sewing pattern in accordance with embroidery data obtained for each closed figure.

For example, as shown in FIG. 9, the embroidery data are prepared on the basis of the outline 31 of the closed area W1, and the figure "dish" 21 is satin-stitched with embroidery thread of "white"; the embroidery data are prepared on the basis of the outline 32 of the closed area W2, and the figure "root" 22 is satin-stitched with embroidery thread of "red"; and the embroidery data are prepared on the basis of the outline 33 of the closed area W3, and the figure "leaf" 23 is satin-stitched with embroidery thread of "green".

Next, the operation of specifying the figures contained in the original picture pattern 20 and identifying the attribute (color) of each figure will be described.

First, the color original pattern 20 are prepared by the line drawing and colored. At this time, the outline 30 and the closed areas which are enclosed by portions of the outline 30 in the original picture pattern 20 are colored or marked. Here, the term "mark" means an operation of specifying the color of the inner side of the closed area, and for example, any character such as "x" or the like may be written at a position within the closed area using a pen with colored ink. In this case, the color within the closed area is identified except for "white".

Subsequently, the original picture pattern which has been colored or marked are read out by the color scanner device 5, and then converted to pattern image data containing the three brightness value data r, g and b for the three primary colors. The pattern image data are stored in the pattern image data memory 12a. On the basis of the pattern image data, the outline portion enclosing each closed area is obtained on the basis of the pattern image data thereby defining each closed area W.

Subsequently, on the basis of the pattern image data, the respective brightness average values Rh, Gh and Bh for the three primary colors are calculated as the statistic of the pattern image data in each closed area W thus specified. Furthermore, the attribute "color" of closed area W in the pattern image is identified on the basis of the brightness average values Rh, Gh and Bh.

Alternatively, each closed area W can be set to be monochromatic, and thus even when the shade of color or unevenness in color density exists in the attribute (color) of closed area in the original picture pattern, they have no effect on the final pattern image. Each closed area W is specified by the portion of the outline 30 so that each closed area W contained in the original picture pattern can be prevented from being deformed or missed. Accordingly, each closed area, and the attribute thereof, can be obtained with high precision so as to be faithful to the original picture pattern 20.

In place of the average brightness values Rh, Gh and Bh of the three primary colors, the median or maximum value of the brightness values may be used. Furthermore, in place of the color scanner device 5, an image scanner device for white and black may be used to prepare pattern image data with grey scale (density values) and, in place of the brightness value, data on hue may be used.

In the above embodiment, the attribute of each closed area which is identified on the basis of the statistic is not necessarily coincident with the attribute of original data on which the statistic is based. For example, different stitching directions may be allocated as an attribute to colors, that is, the stitching direction may be varied in accordance with the color as an attribute. Specifically, "longitudinal stitch" may be allocated to "green" while "lateral stitch" is allocated to "red".

The invention is not limited to the above embodiment. Various modifications may be made to the above embodiment without departing from the subject matter of the invention on the basis of existing techniques and techniques which are obvious to persons skilled in the art.

In the above embodiment, the name of thread color is directly displayed on the embroidery-sewing machine, however, a message "please exchange thread" may be displayed on the basis of the data indicating the necessity for an exchange of thread.

Further, in the above embodiment, the outline WO at the outside and the boundaries between the closed areas are not embroidered. However, the outline WO and the boundaries between the closed areas may be embroidered together with the inside of the closed areas.

What is claimed is:

1. An image figure processing device, comprising:
    image input means for reading out an original picture pattern, which is drawn with an outline so as to be discriminable during image processing, and converting the pattern to the pattern image data;
    closed-area specifying means for receiving the pattern image data from said image input means to specify data for at least one closed area which is surrounded by a portion of the outline in the original picture pattern;

calculation means for calculating a representation value of the pattern image data for each figure specified by said closed area specifying means on the basis of the pattern image data which are obtained by said image input means;

closed area attribute identification means for identifying attribute data for each closed area in the pattern image on the basis of the representative value calculated by said calculation means; and image data creating means for extracting image data representing each closed area on the basis of the attribute data identified by said closed area attribute identification means.

2. The image figure processing device according to claim 1, wherein said calculation means calculates the representative value of the pattern image data based on brightness of each of three primary color (RGB) components for each closed area.

3. The image figure processing device according to claim 2, wherein said calculation means calculates an average value based on the brightness of each of the three primary color (RGB) components as the representative value of each closed area.

4. The image figure processing device according to claim 1, further comprising embroidery data preparing means for preparing embroidery data on the basis of the image data extracted by said image data creating means.

5. The image figure processing device according to claim 1, further comprising stitch data preparing means for preparing stitch data for each closed area based on the image data extracted by said image data creating means.

6. The image figure processing device according to claim 1, further comprising an input port, wherein said image input means comprises a computer connected to the image figure processing device through said input port.

7. The image figure processing device according to claim 1, wherein said image input means comprises a scanning device.

8. The image figure processing device according to claim 4, further comprising an output port, wherein the image figure processing device is connected to a sewing machine through said output port.

9. The image figure processing device according to claim 4, further comprising storage means for storing the embroidery data output by said embroidery data preparing means.

10. The image figure processing device according to claim 5, further comprising an output port, wherein the image figure processing device is connected to a sewing machine through said output port.

11. The image figure processing device according to claim 5, further comprising storage means for storing the embroidery data output by said embroidery data preparing means.

12. An image figure processing method for creating sewing data, comprising the steps of:

reading out an original picture pattern;

converting the original picture pattern to pattern image data;

processing the pattern image data to identify each closed area in the pattern image;

specifying a discriminator of the pattern image data of each closed area;

identifying an attribute of each closed area in the pattern image on the basis of the discriminator;

creating embroidery stitch data for each closed area on the basis of and incorporating the attribute for that closed area; and storing the embroidery stitch data in a memory device for subsequently sewing by an embroidery-sewing machine.

13. The method according to claim 12, wherein the step of specifying a discriminator comprises the steps of calculating a representative value that identifies a characteristic of each closed area.

14. An embroidery stitch data creation device, comprising:

an input device for inputting a pattern;

discriminating means for defining closed areas making up the pattern;

conversion means for converting each closed area within the closed areas into pixel data defining at least one characteristic of each pixel;

determining means for analyzing all pixel data for each closed area to define an area characteristic;

assigning means for assigning an attribute to each area characteristic; and stitch data preparing means for preparing stitch data for each closed area that incorporates the attribute.

15. The device according to claim 14, wherein said conversion means includes discrimination means for defining each pixel in terms of a red color component, a green color component and a blue color component.

16. The device according to claim 14, wherein said determining means performs an operation selected from a group consisting of calculating an average value, or selecting a one of maximum value, a minimum value or a median value to define the area characteristic.

17. The device according to claim 14, further comprising an input port, wherein said input device comprises a computer connected to the embroidery stitch data creation device through said input port.

18. The device according to claim 14, wherein said input device comprises a scanning device.

19. The device according to claim 14, further comprising an output port, wherein the embroidery stitch data creation device is connected to a sewing machine through said output port.

20. The device according to claim 14, further comprising storage means for storing the stitch data output by said stitch data preparing means.

21. The device according to claim 14, wherein the closed areas are defined by being colored.

22. The device according to claim 14, wherein the closed areas are defined by being marked by outline segments.

23. The devices according to claim 14, wherein reading out the original picture pattern includes identifying colors or hatching representing colors in the original picture pattern.

* * * * *